United States Patent [19]

Davidov et al.

[11] Patent Number: 4,591,915
[45] Date of Patent: May 27, 1986

[54] REMOTE VOLUME CONTROL BY MEANS OF FREQUENCY MODULATION FEEDBACK LOOP

[75] Inventors: Mircho A. Davidov; Lance Katzfey, both of San Diego, Calif.

[73] Assignee: Oak Industries Inc., Rancho Bernardo, Calif.

[21] Appl. No.: 601,595

[22] Filed: Apr. 18, 1984

[51] Int. Cl.⁴ ............... H04N 5/44; H04N 5/62; H04N 5/60; H04B 7/00
[52] U.S. Cl. .................. 358/194.1; 358/197; 358/198; 455/311
[58] Field of Search ............ 358/194.1, 197, 196, 358/198; 455/236, 311

[56] References Cited

U.S. PATENT DOCUMENTS 4,470,071  9/1984  Rindal ............................ 358/198
4,490,943  12/1984  Mycynek et al. ............... 358/197

Primary Examiner—Michael A. Masinick
Assistant Examiner—E. Anne Toth
Attorney, Agent, or Firm—Kinzer, Plyer, Dorn & McEachran

[57] ABSTRACT

A TV frequency modulation feedback loop (FMFB) remote volume control includes an RF input and a mixing means with the RF input being connected to and providing one input for the mixing means. A voltage controlled oscillator is connected to the mixing means and provides the other input thereto. The output from the mixing means is an IF FM sound signal which is connected to a demodulator. A remotely operable deviation control is connected to the output of the demodulator for changing the amplitude of the demodulated sound signal. The deviation control is connected to and provides a deviation controlled input for the VCO.

10 Claims, 4 Drawing Figures

REMOTE VOLUME CONTROL BY MEANS OF FREQUENCY MODULATION FEEDBACK LOOP

SUMMARY OF THE INVENTION

The present invention relates to volume control circuits having particular utility in cable television, over-the-air pay television or satellite television converters.

A primary purpose is an FM feedback loop remote volume control which controls the deviation of the audio FM signals.

Another purpose of the invention is an FM feedback loop remote volume control for the use described which includes a deviation control circuit to vary the amplitude of a demodulated FM audio signal with the deviation controlled signal providing the input for a VCO.

Another purpose is an FM feedback loop remote volume control of the type described which eliminates the effect of the deviation control on common mode spurious deviation.

Another purpose is an FM volume control of the type described utilizing fewer electronic stages than open loop circuits performing the same function.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention has utility as a volume control for cable television converters and for over-the-air or satellite pay television converters. The principles herein will be described in that environment, although the remote volume control frequency modulated feedback loop may have other applications.

An RF FM sound signal may be volume controlled by means of a conventional demodulation/remodulation circuit or by a frequency modulation feedback loop (FMFB). In a demodulation/remodulation volume control, the RF FM sound signal is first demodulated, after which a remotely operated device modifies the amplitude of the demodulated signal. The modified demodulated sound TV signal is then applied to an FM remodulator whose deviation will then vary in accordance with the remotely controlled amplitude of the demodulated sound television signal. This technique is routinely used in television sets to remotely control the sound volume or loudness.

A frequency modulated feedback loop provides frequency deviation or compression and/or expansion, and therefore volume control, by varying the deviation of a voltage controlled oscillator (VCO) and the IF carrier in a frequency tracking loop. This has an important advantage in that it eliminates one or more electronic stages, when compared with the demodulation/remodulation technique. It also has the additional and perhaps more important advantage in that it permits the elimination of the effect of deviation control on common mode spurious deviation, which is commonly referred to as power hum without demodulating the video carrier in the process. In a conventional television set, the power hum or common mode spurious deviation is normally removed by multiplication of the audio and video signals. However, if the spurious deviations in these FM signals are not the same, the multiplication technique will not eliminate the common mode spurious deviation. In TV sets or baseband set-top converters, the spurious signals are eliminated by first demodulating the sound carrier or an intercarrier detector, demodulating the video with a phase insensitive amplitude detector and then remodulating spurious signal free audio and video signals for display on a TV set. By the use of a frequency modulated feedback loop as described herein, it is practical to maintain the same deviation for both the video and audio FM signals, principally by eliminating the effect of audio deviation control on the common mode spurious deviation accompanying the audio signal without going through the process of demodulation and remodulation.

Figure 1:
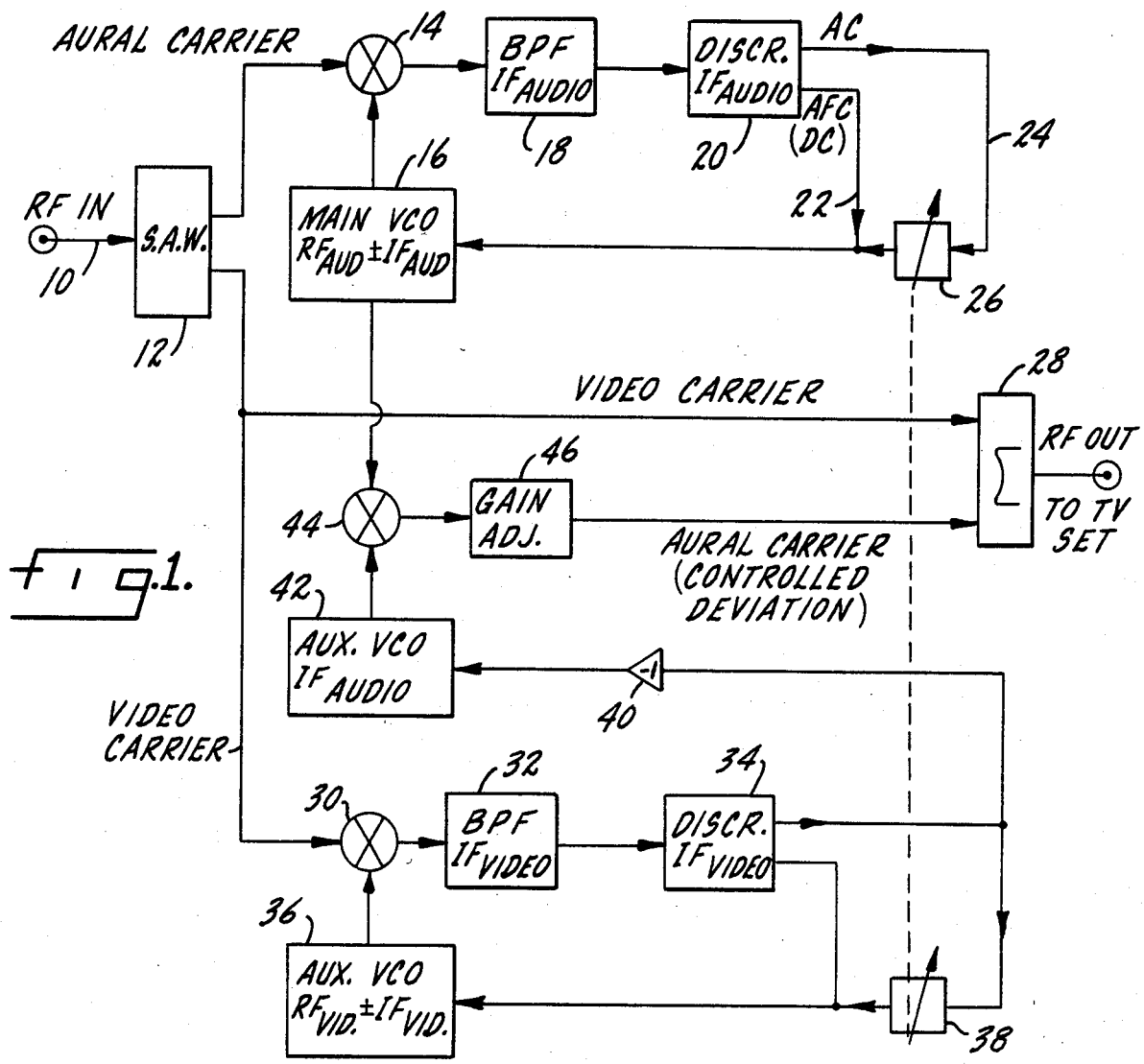
FIG. 1 is a block diagram of one embodiment of a frequency modulated feedback loop (FMFB) providing remote volume control.

In FIG. 1, an RF input 10 will provide video and audio or sound signals at an RF carrier frequency to a filter 12, which may be a surface acoustic wave type of filter or otherwise. Filter 12 may have a bandwidth sufficient to pass channels 2, 3 or 4, common in cable TV converters and it is intended to separate video and audio carrier signals on a particular channel. The output from filter 12 is connected to a mixer 14 which receives its other input from a voltage controlled oscillator or VCO 16. The nominal frequency of VCO 16 is equal to the sound RF carrier frequency and the IF carrier frequency. For example, assuming the sound has a carrier frequency of 65.75 MHz and it is desired to have an IF frequency of 4.5 MHz, VCO 16 will have a nominal output frequency of 70.25 MHz.

The output from mixer 14 is connected to an IF filter 18, with the output from the filter being connected to a discriminator 20 which will demodulate the FM IF sound signal. Discriminator 20 has two outputs, the first being an automatic frequency control DC signal on line 22 and the second an AC automatic frequency control signal on line 24. Line 24 is connected to a deviation control circuit 26 which is remotely operable by any one of a number of commercial remotely operable television control devices. Deviation control circuit 26 is effective to vary the amplitude, either up or down, of the demodulated FM audio signal. The output from deviation control circuit 26 is connected to VCO 16 to provide the control voltage therefor. Thus, the compression or expansion of the FM audio signal which is effective to vary the volume of the sound as it is heard from the television speakers, will be controlled by deviation control 26 which is effective to vary the output frequency of VCO 16.

Figure 2:
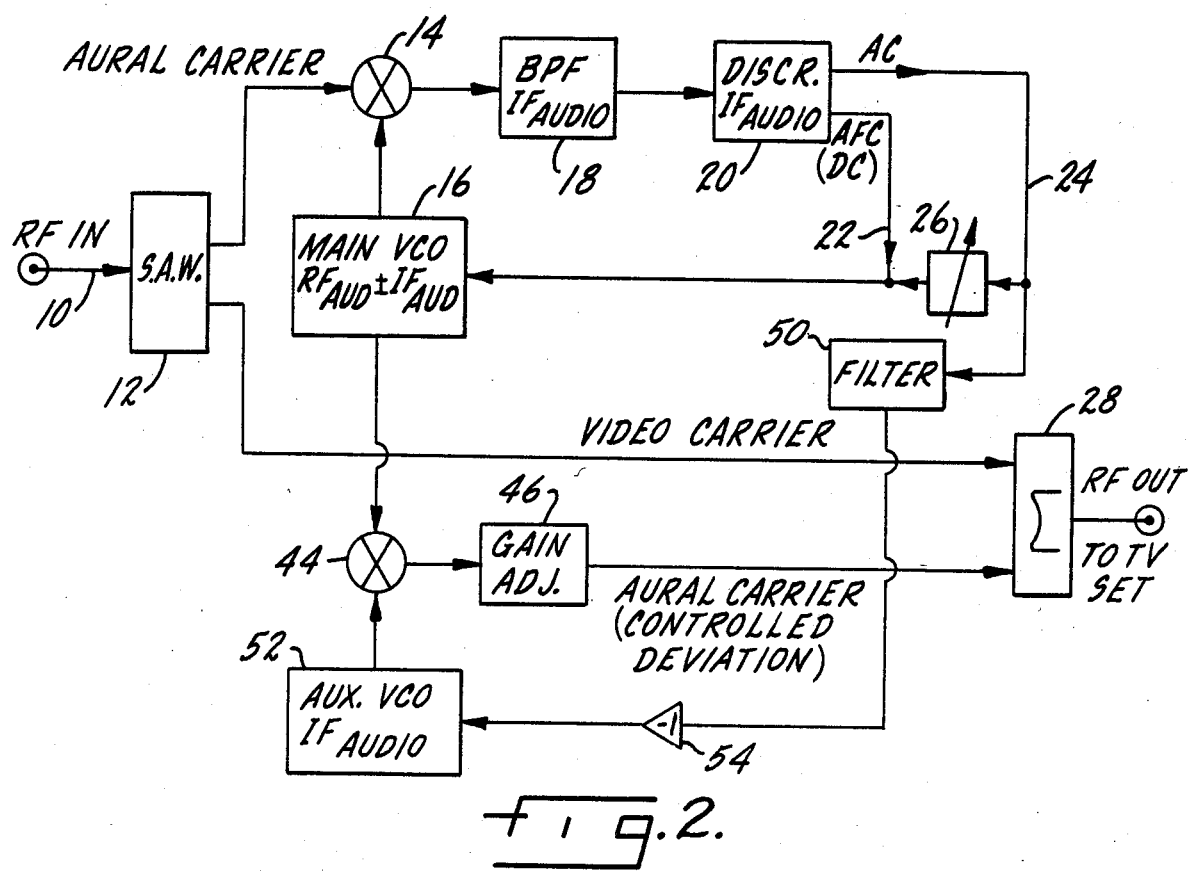
FIG. 2 is a block diagram of a second embodiment of FMFB.

Common mode spurious deviation will accompany the audio signal and the deviation control applied, as described above, will be similarly applied to the common mode spurious deviation. However, it is desirable to eliminate the effect of the deviation control on common mode spurious deviation so that the same common mode spurious deviation will accompany both the audio and the visual or video signals. FIGS. 1 and 2 show variant forms of circuits for eliminating the effect of the deviation control on the common mode spurious deviation accompanying the audio signal.

In FIG. 1, the output from filter 12, in addition to the audio carrier described, will provide a video carrier output which will be directly connected to a combiner circuit 28 which will have a video and audio output usable in a conventional television set. The video carrier will also be connected to a second mixer 30 which is in a closed feedback loop with a bandpass filter 32, a discriminator 34 and a second or auxiliary voltage controlled oscillator 36. Since the video carrier applied to mixer 30 will have the same common mode spurious deviation as was accompanying the audio carrier, the closed loop circuit described and including a similar deviation control 38, will have the same effect on the common mode spurious deviation accompanying the video signal as the earlier-described feedback loop had on the common mode spurious deviation accompanying the audio signal. In this connection, the voltage controlled gain for both the audio and video feedback loop may be from a single remote control source. The signal at the input of the deviation control 38 will be a signal representative of the effect of that deviation control on the common mode spurious deviation accompanying the video signal. This signal may be applied through an inverting amplifier 40 to a second auxiliary voltage controlled oscillator 42 whereby the effect on the common mode spurious deviation by the voltage controlled gain will control the output of auxiliary VCO 42, which output will be fed to a mixer 44 along with the output from the main VCO 16. Thus, the effect of deviation control or volume control on the common mode spurious deviation accompanying the audio signal is cancelled and the resultant audio signal output from mixer 44, after being passed through a gain adjust circuit 46, will be the audio or aural carrier with controlled deviation and without any effect on the common mode spurious deviation accompanying the aural carrier.

The main VCO, as described above, will have a nominal output frequency of 70.25 MHz. Auxiliary VCO 36 will have a nominal output frequency of the RF video carrier frequency plus the IF video frequency or an output frequency of 71.95 MHz. Thus, bandpass filter 32 will pass an IF frequency of 1.7 MHZ, the IF frequency of the video feedback loop described.

In the FIG. 1 embodiment, as in the FIG. 2 embodiment to be described, the RF input is connected to a surface acoustic wave filter. It should be understood that other forms of input circuits may be equally satisfactory. For example, there may be a splitter with an aural carrier trap to provide the visual carrier signal. In a third form, instead of either a saw filter or a splitter and a trap at RF frequencies, which can present some circuit problems, the composite RF input of both the aural and visual RF carriers can be first mixed with an oscillator having a frequency of the RF audio plus or minus 4.5 MHz. The mixed down aural carrier is now at 4.5 MHz and can be trapped by a standard 4.5 MHz trap. The resulting signal contains only the video carrier modulated signal and by mixing it with the same oscillator, the visual carrier is now again at a regular RF video frequency and can be summed with the aural carrier output from the aural FMFB feedback loop.

In FIG. 2, those elements performing the same function as in FIG. 1 have been given like designations. In the FIG. 2 embodiment, in order to eliminate the effect of deviation control on common mode spurious deviation, the input at the deviation control 26 is also connected to a filter 50 which will pass only the common mode spurious voltage or signal since the common mode spurious deviation is normally confined to a small portion of the audio frequency range. The output from filter 50 is connected to an auxiliary VCO 52 which in turn is connected to mixer 44. There is an inverting amplifier 54 connected between the output of filter 50 and the input to auxiliary VCO 52 whereby the signal representative of the effect of the deviation control on common mode spurious deviation is reversed in polarity.

Thus, the circuit of FIG. 2, as in the case of FIG. 1, provides a reliable and simply constructed means for eliminating the effect of the audio deviation control on the common mode spurious deviation accompanying the aural carrier so that the audio and video carriers may be used in the conventional manner in a television set to eliminate power hum or buzz.

Figure 3:
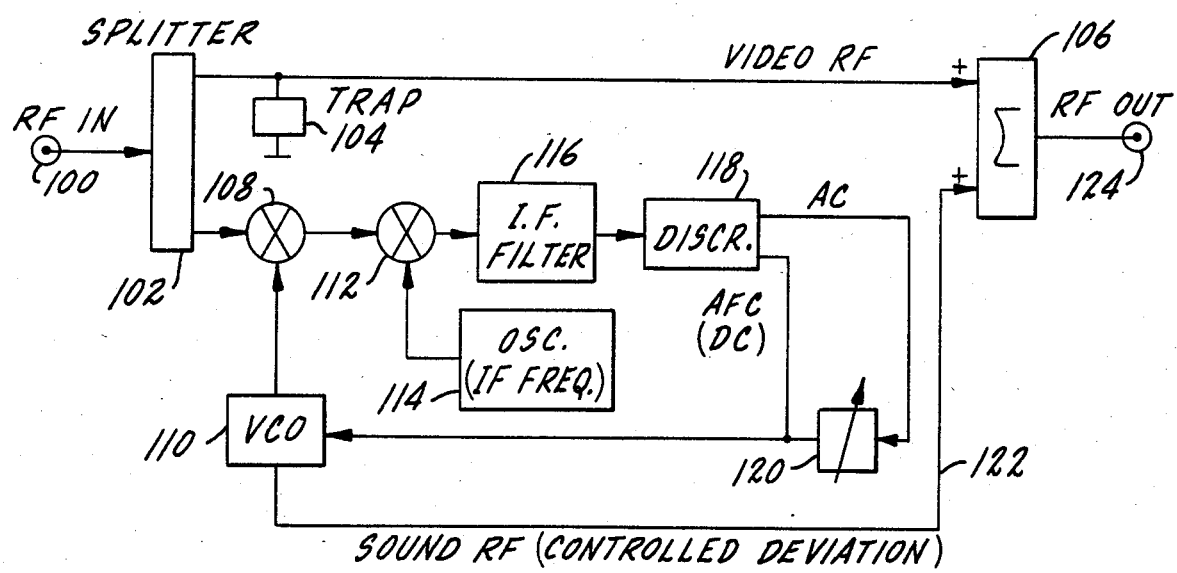
FIG. 3 is a block diagram of a third FMFB embodiment.
Figure 4:
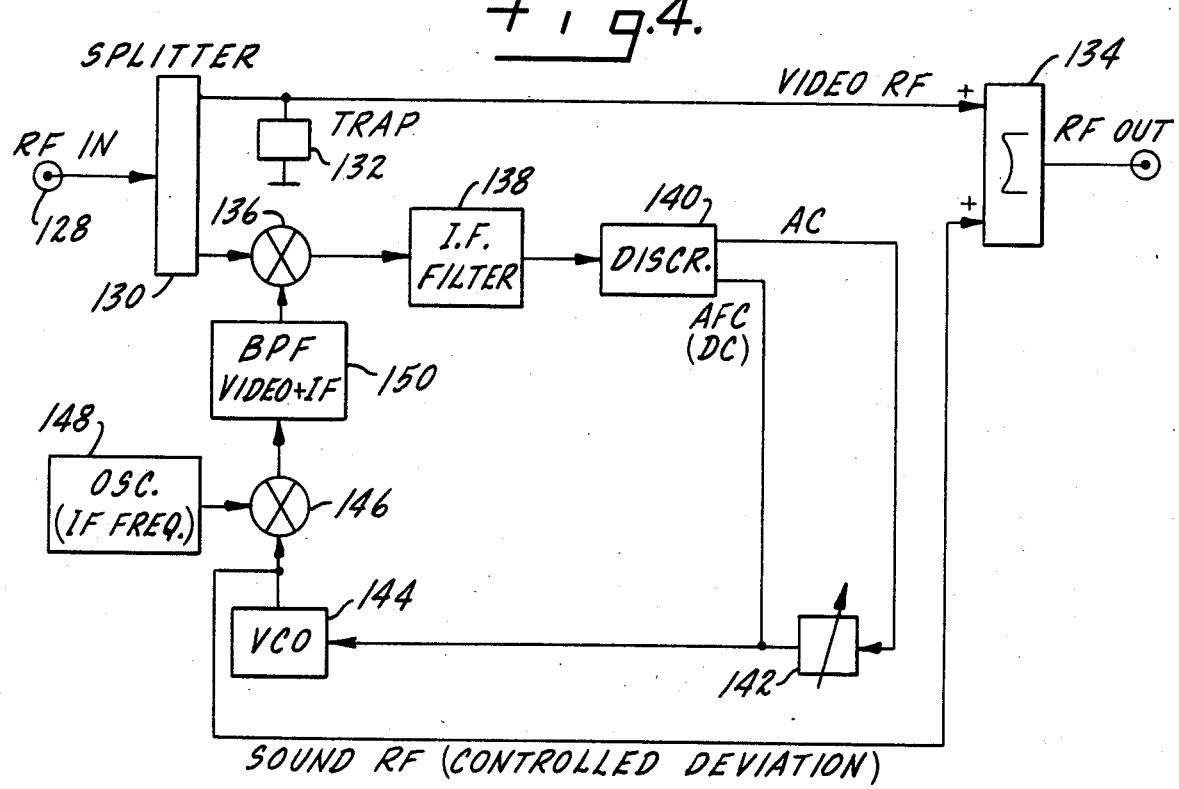
FIG. 4 is a block diagram of a fourth FMFB embodiment.

In the embodiments of FIGS. 3 and 4 there are no provisions for eliminating the effect of deviation control on common mode spurious deviation and these embodiments are particularly used with television sets which do not use intercarrier detectors for audio recovery so there would be no need to maintain the same common mode spurious deviation on both the aural and visual carriers.

In the embodiment of FIG. 3, there is an RF input circuit 100 which is connected to a splitter 102. A trap 104 removes the sound RF signal and the video signal is passed directly to a combiner 106.

The sound signal path in the circuit of FIG. 3 includes a mixer 108 which has at one input the RF sound signal and at a second input the output of VCO 110 which will have a frequency equal to the nominal carrier frequency of the sound RF signal or in the illustrative example 65.75 MHz. The output from mixer 108 is connected to a second mixer 112 which has its other input connected to an IF frequency oscillator 114. Thus, the output from mixer 112 is an IF sound signal having a frequency of 4.5 MHz. Mixer 112 is connected to an IF filter 116 and to a discriminator 118. The discriminator output is connected to a deviation control 120 whose output is connected to VCO 110. The output from VCO 110, a deviation controlled sound signal at RF frequency, is passed by line 122 directly to combiner circuit 106 where the sound and video signals are combined and passed to an RF output circuit 124.

In the embodiment of FIG. 4, an RF input circuit 128 is connected to a splitter 130 which may in the alternative be a surface acoustic wave device. The video output from splitter 130 is connected to a sound RF trap 132 and then to a combiner circuit 134. The RF sound output of splitter 130 is connected to a mixer 136. Mixer 136 is connected to an IF filter 138 and then to a discriminator 140 which will demodulate the IF frequency sound signal. A remotely operable deviation control circuit 142 is connected to discriminator 140 and to a VCO 144. VCO 144 will have an output frequency equal to the nominal RF sound carrier frequency and thus the output from VCO 144 may be directly connected to combiner circuit 134 and will be a deviation controlled sound RF signal as described above. To complete the feedback loop, the RF deviation controlled output of VCO 144 is connected to a second mixer 146 which receives its other input from IF frequency oscillator 148. A bandpass filter 150 is connected between mixer 146 and mixer 136. Accordingly, the input to mixer 136, in addition to the RF sound signal, will be a signal having the frequency of the sound RF carrier plus the IF frequency, or in the illustrative example, a frequency of 70.25 MHz. The frequency of the output of mixer 136 will be varied in accordance with deviation control 142 to provide the necessary volume control as described.

All embodiments of the invention utilize a frequency modulated feedback loop which includes a remotely operable deviation control circuit for varying the amplitude of a demodulated FM sound signal. The output from the deviation control circuit is connected to a voltage controlled oscillator which may have a nominal frequency of the RF sound signal or a nominal frequency of the RF sound signal plus the IF frequency, depending upon the specific embodiment. In two embodiments, the common mode spurious deviation accompanying the audio carrier is not effected by the deviation control of the audio signal, whereas, in the embodiments of FIGS. 3 and 4, there is no attempt made to eliminate the effect of deviation control on common mode spurious deviation. Both forms of the invention are satisfactory and largely depend upon the type of television set which will receive the signals and the manner in which audio recovery is made in the television set.

Whereas the preferred form of the invention has been shown and described herein, it should be realized that there may be many modifications, substitutions and alterations thereto.

The embodiments of the invention in which an exclusive property or privilege is claimed are defined as follows:

1. A TV frequency modulation feedback loop (FMFB) remote volume control including an RF input including an RF video signal and an RF sound signal, mixing means, said RF input being connected to and providing one input for said mixing means, voltage controlled oscillator means (VCO) connected to said mixing means and providing another input thereto, with the output from said mixing means being an IF FM sound signal, means for demodulating the IF FM sound signal output from said mixing means, a remotely operable deviation control connected to the output of said demodulating means for changing the amplitude of the demodulated sound signal, said deviation control being connected to and providing a deviation control input for sid VCO to thereby vary the deviation of the RF sound signal.

2. The FMFB of claim 1 further characterized in that said FM sound signal includes common mode spurious deviation, and means for reducing the effect of said deviation control on said common mode spurious deviation.

3. The FMFB of claim 2 further characterized in that the means for reducing said common mode spurious deviation includes a second mixing means connected to the output of said first VCO, a second VCO connected to said second mixing means, and means for providing a signal to said second VCO representative of the effect of said deviation control on said common mode spurious deviation.

4. The FMFB of claim 3 further characterized in that the signal representative of the effect of said deviation control on the common mode spurious deviation is derived by the application of said deviation control to the RF video signal.

5. The FMFB of claim 4 further characterized by and including a third mixing means, third VCO and second demodulating means connected in a feedback loop to process the RF video signal, with said deviation control providing a deviation control input for said third VCO, with the input for said third VCO also providing the signal representative of the effect of said deviation control on common mode spurious deviation.

6. The FMFB of claim 3 further characterized in that the means for providing a signal representative of the effect of said deviation control on said common mode spurious deviation includes a filter connected to the output of said deviation control to separate the signal representative of the effect of said deviation control on said common mode spurious deviation.

7. The FMFB of claim 1 further characterized in that said VCO has a nominal output frequency equal to the nominal RF carrier frequency plus the nominal IF frequency.

8. The FMFB of claim 1 further characterized in that said VCO has a nominal output frequency equal to the nominal RF carrier frequency, with said mixing means including a first mixer connected to said RF input, a second mixer and an oscillator having an output frequency equal to the nominal IF frequency connected to said second mixer, with said second mixer being connected to said first mixer.

9. The FMFB of claim 8 further characterized in that said second mixer is connected to the output of said first mixer, with the output of said second mixer being an IF frequency sound signal connected to said demodulating means.

10. The FMFB of claim 8 further characterized in that the output of said second mixer is connected to said first mixer, with one input for said second mixer being from said RF carrier frequency output VCO.

* * * * *